(12) United States Patent
Amacker

(10) Patent No.: US 7,958,143 B1
(45) Date of Patent: Jun. 7, 2011

(54) CONTEXT SEARCH TO REFINE A SEARCH

(75) Inventor: Matthew W. Amacker, San Jose, CA (US)

(73) Assignee: A9.Com, Inc., Palo Alto, CA (US)

( * ) Notice: Subject to any disclaimer, the term of this patent is extended or adjusted under 35 U.S.C. 154(b) by 393 days.

(21) Appl. No.: 12/264,594

(22) Filed: Nov. 4, 2008

(51) Int. Cl.
*G06F 7/00* (2006.01)
*G06F 17/30* (2006.01)

(52) U.S. Cl. .................................. 707/771; 707/736

(58) Field of Classification Search .................. 707/736, 707/771
See application file for complete search history.

(56) References Cited

U.S. PATENT DOCUMENTS

| 7,555,476 | B2 * | 6/2009 | Holbrook | 1/1 |
| 2005/0021553 | A1 * | 1/2005 | Romijn et al. | 707/102 |
| 2007/0192800 | A1 * | 8/2007 | Walter et al. | 725/53 |
| 2007/0204232 | A1 * | 8/2007 | Ray et al. | 715/738 |

\* cited by examiner

*Primary Examiner* — Kuen S Lu
(74) *Attorney, Agent, or Firm* — Kilpatrick Townsend & Stockton LLP

(57) ABSTRACT

Systems, methods, computer readable media having computer-executable components, and user interfaces for performing a search within a selected category are disclosed. One or more categories are presented where each of the categories is associated with at least one search result of a first set of search results retrieved in response to a first search. A selected category is specified by a user and, in response to receiving the user selection of the selected category, a search input field is produced at a location proximate to the selected category. The search input field receives at least one search term to be used in a refined search of at least one item resulting from the search that is associated with the selected category.

12 Claims, 17 Drawing Sheets

CONTEXT SEARCH TO REFINE A SEARCH

I. BACKGROUND

Many network resources, such as electronic commerce (e-commerce) web sites and informational web sites, provide two ways for a user to find specific items of interest: searches and category lists. A search enables the user to submit a query, including a search term or a search string. The network resource receives and processes the query, returning to the user a list of results that match or nearly match the query. A category list presents a plurality of categories into which items for purchase or other items are classified. By manipulating a cursor, the user can select a category from the category list that matches or most nearly matches the user's objective. If the category selected includes one or more subcategories or multiple levels of subcategories, the user can select the subcategory or successive subcategories of interest as the user seeks a desired item.

Unfortunately, using searches and category lists may be mutually exclusive. For example, some web sites do not enable a search to be limited to a particular category from the category list. As a result, although a user may use the category list to narrow the focus of a search, when the user enters the search, the search may be performed over the entire web site instead of over the category of interest that the user has selected. Further, even if a web site permits a user to combine an ability to perform a search with an ability to use a category list, the process may be cumbersome. For example, the user may have to select a category from one portion of a web site interface and enter search terms and execute a search from a different portion of the web site interface.

II. BRIEF DESCRIPTION OF THE DRAWINGS

III. DETAILED DESCRIPTION

Figure 1:
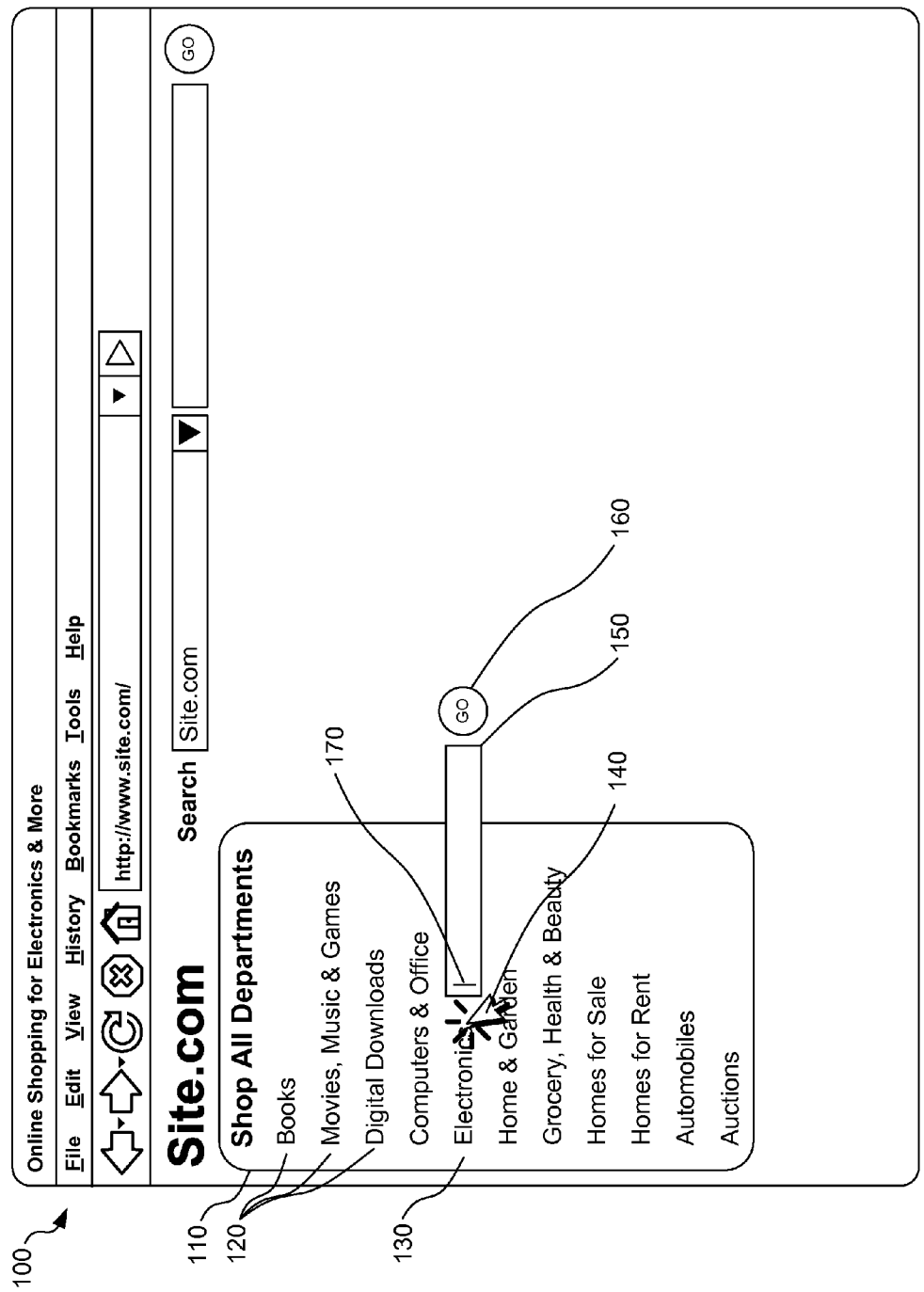
FIG. 1 depicts an illustrative embodiment of a user interface enabling a user to perform a context search from a home screen.

Systems, methods, and computer readable media having a computer-executable component are disclosed to enable a user to perform a context search within a selected category to refine a search. A context search, as described herein, is the ability for the user to perform a search of a selected category or subcategory from within a current context or situation within the user interface presented by a display where the user finds himself or herself at the moment. For example, if the user already has commenced a search and, while reviewing the results and the categories into which the search results are classified or that are otherwise associated with the search results, a context search enables the user to perform a further search of one of the categories by selecting that category. Once the user selects the category, such as by clicking on the category or allowing the cursor to hover over the selected category, a search input field is presented proximate to the selected category in the user interface. Thus, without having to navigate away from a set of search results, the user is able to perform a search in the selected category.

In using a network resource, such as an electronic commerce (e-commerce) web site, the user may be presented with an opportunity to search a plurality of searchable items among a number of categories. The searchable items may include all of the items available to be searched at the network resource, or the searchable items may include a set of search results presented in response to an initial search. In either case, the user may select one of the categories to perform a context search.

Similarly, when the user is browsing a list of categories from a main screen, even before the user has initiated a search, context search enables the user to select one of the categories to invoke a search input field proximate to the selected category to facilitate a search of the selected category. Thus, the context search enables the user to initiate a search without having to move a cursor to an input location away from the list of categories to enable the user to perform a search directly from the user's present context or situation.

The selected category may be one of a number of main categories into which all of the searchable items are classified or may include one of one or more levels of subcategories into which the categories are divided. Context search enables the user to search within any of the main categories by specifying a selected category from one of the main categories, to be presented with a search input field proximate to the location of the selected category, and to enter the search terms into the search input presented at that location. Alternatively, the user can search within categories into which search results from one or more previous searches have been classified in order to refine the search. In addition, from a list of categories, a user can select one or more subcategories in which to perform a search. Also, if the user has already performed one or more previous searches within one or more category levels, the user can choose a selected category from one or more categories included in a history list presented in a search header for the user's search. Therefore, embodiments of the present disclosure allow the user to perform or refine searches within a selected category without exiting a current position or context within a hierarchy of search screens and without leaving a location on a user interface where the selected category is present. As a result, the user can search within categories with greater ease.

FIG. 1 shows a user interface 100 representing a home screen of a network resource that includes an embodiment of the present disclosure. The user interface 100 presents a category list 110. The category list 110 on the home screen may include a plurality of categories 120 that represent main categories into which searchable items accessible through the network resource are classified. According to one embodiment, a user may identify a selected category 130, such as "Electronics," in which to perform a context search by selecting the category with an input device by directing a cursor 140 to the selected category 130 and choosing the selected category 130.

In one embodiment, choosing the selected category 130 by "clicking on" the selected category 130 using a primary input button or left button on a mouse or a touch pad device may initiate a context search by causing the user interface 100 to present a search input 150 and a go button 160. The search input field 150 may include an input cursor 170 indicating the user may enter text at a location in the search input field 150. After entering one or more search terms, selecting the go button 160 initiates a search of the selected category 130 for searchable items classified under or otherwise associated with the selected category 130, presenting descriptions that include the one or more search terms entered in the search input field 150. As further described below, using the context search function yields a list of relevant search results (if any) including one or more searchable items that include the one or more search terms entered in the search input field 150.

In embodiments of the user interface, clicking on the selected category 130 using the primary input button or left button on the mouse or the touch pad device, instead of initiating a context search, may retrieve a list of subcategories (not shown in FIG. 1) for the selected category 130. In such embodiments, to invoke a context search function instead of retrieving the list of subcategories, the user may use a second input button or right button on the mouse or touch pad device to invoke the context search function and cause the search input field 150 to be presented by the user interface. According to another embodiment, the user may invoke the context search function by positioning the cursor 140 over the selected category 130 and by causing the cursor 140 to hover over the selected category 130. According to still another embodiment, the user may invoke the context search function by selecting an indicator adjacent to the selected category, as is further described below with reference to FIGS. 6-16.

Figure 2:
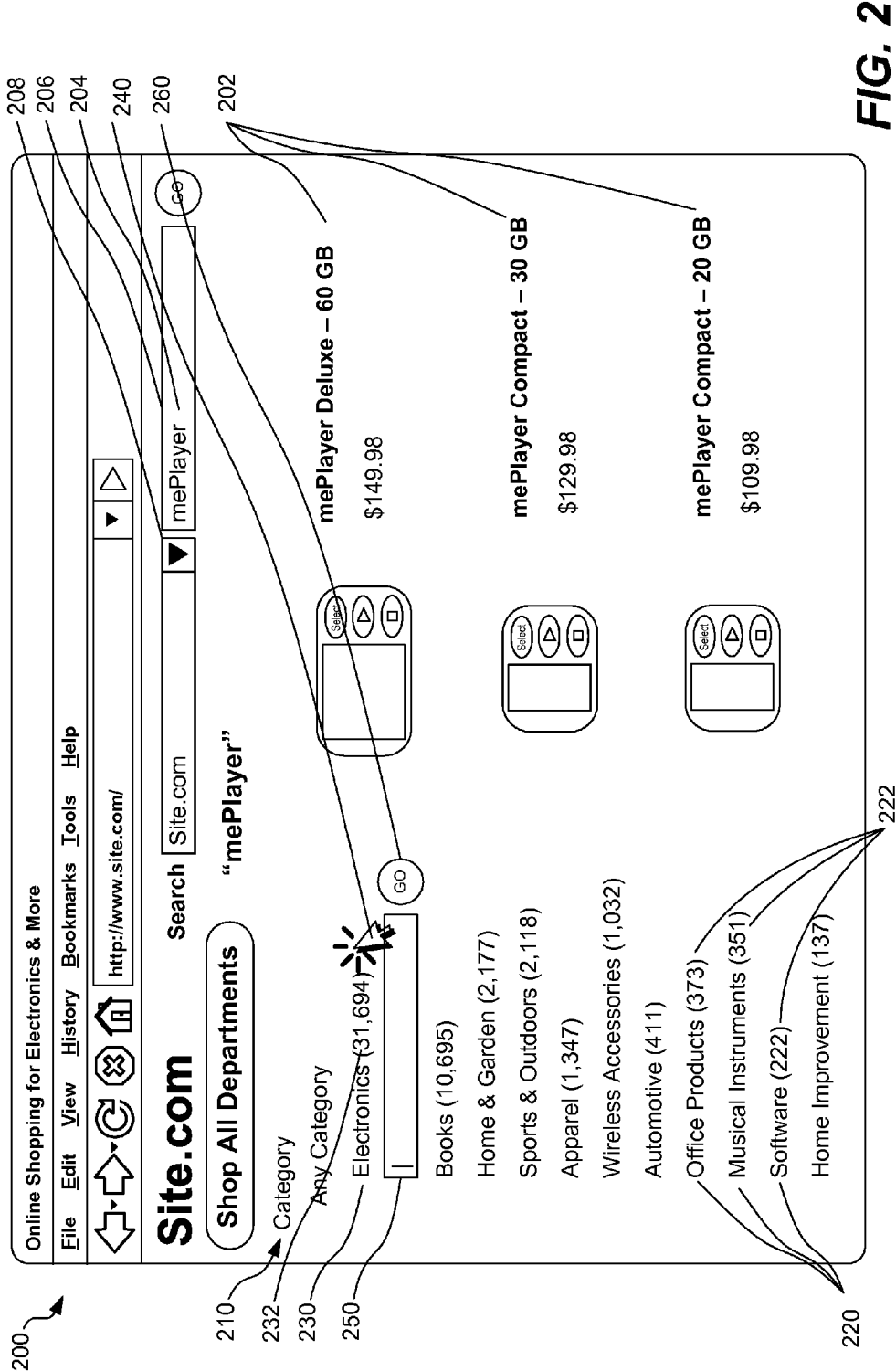
FIG. 2 depicts an illustrative embodiment of a user interface enabling a user to perform a context search to narrow a list of search results retrieved in response to a previous search.

FIG. 2 shows a user interface 200 representing a search results screen displaying a plurality of search results 202 presented in response to a previous search of a network resource that includes an embodiment of the present disclosure. The plurality of search results 202 have been returned in response to a search including search terms 204. Like the user interface 100 of FIG. 1, the user interface 200 presents a category list 210. In one embodiment, the category list 210 presented by the user interface 200 of the search results screen includes a plurality of categories 220, where each of the plurality of categories 220 represents a category into which one or more of the plurality of search results 202 has been classified or with which one or more of the plurality of search results has been classified or otherwise has been associated. In one embodiment, each of the plurality of categories 220 is associated with a number of the search results 222 among the plurality of search results 202 that are classified under or are otherwise associated with each of the plurality of categories 220. For example, the category "Electronics" 230 is associated with a number of search results 232 totaling 31,694.

Assuming the user is interested in search results classified under or otherwise associated with the category "Electronics" 230, instead of paging through the thousands of search results, according to one embodiment, the user can perform a context search on the category "Electronics" 230. To invoke a category search, the user manipulates a cursor 240 and uses the cursor 240 to choose the category "Electronics" 230 as the selected category as previously described with reference to FIG. 1. A search input field 250 and a go button 260 are presented proximate to the selected category 230 in response to the user's selection. The user then may enter one or more search terms in the search input field 250. According to one embodiment, the one or more search terms entered in the search input field 250 are appended to the original search terms 204. Thus, when the user selects the go button 260, the context search refines the original search by searching searchable results classified under or otherwise associated with the selected category 230 for searchable items including the original search terms 204 and newly added search terms entered in the search input field 250.

In performing a context search, according to one embodiment, the user need not retreat to an earlier screen to initiate a new search or refine an existing search. Instead, the user can perform the refined search from the current user interface 200 showing the plurality of search results 202 retrieved in response to the user's previous search. Moreover, the user can initiate the context search of the selected category 230 without having to navigate to a different portion of the user interface 200, such as a search bar 206 located at another location within the user interface to append new search terms to an existing search field. Further, the user can perform a context search of the selected category 230 without having to separately or additionally manipulate a pull-down menu 208 to direct a further search to a selected category. By using an embodiment of context search, the user can refine the previous search at the point of interest within the current user interface 200 and without having to separately identify the selected category 230.

Figure 3:
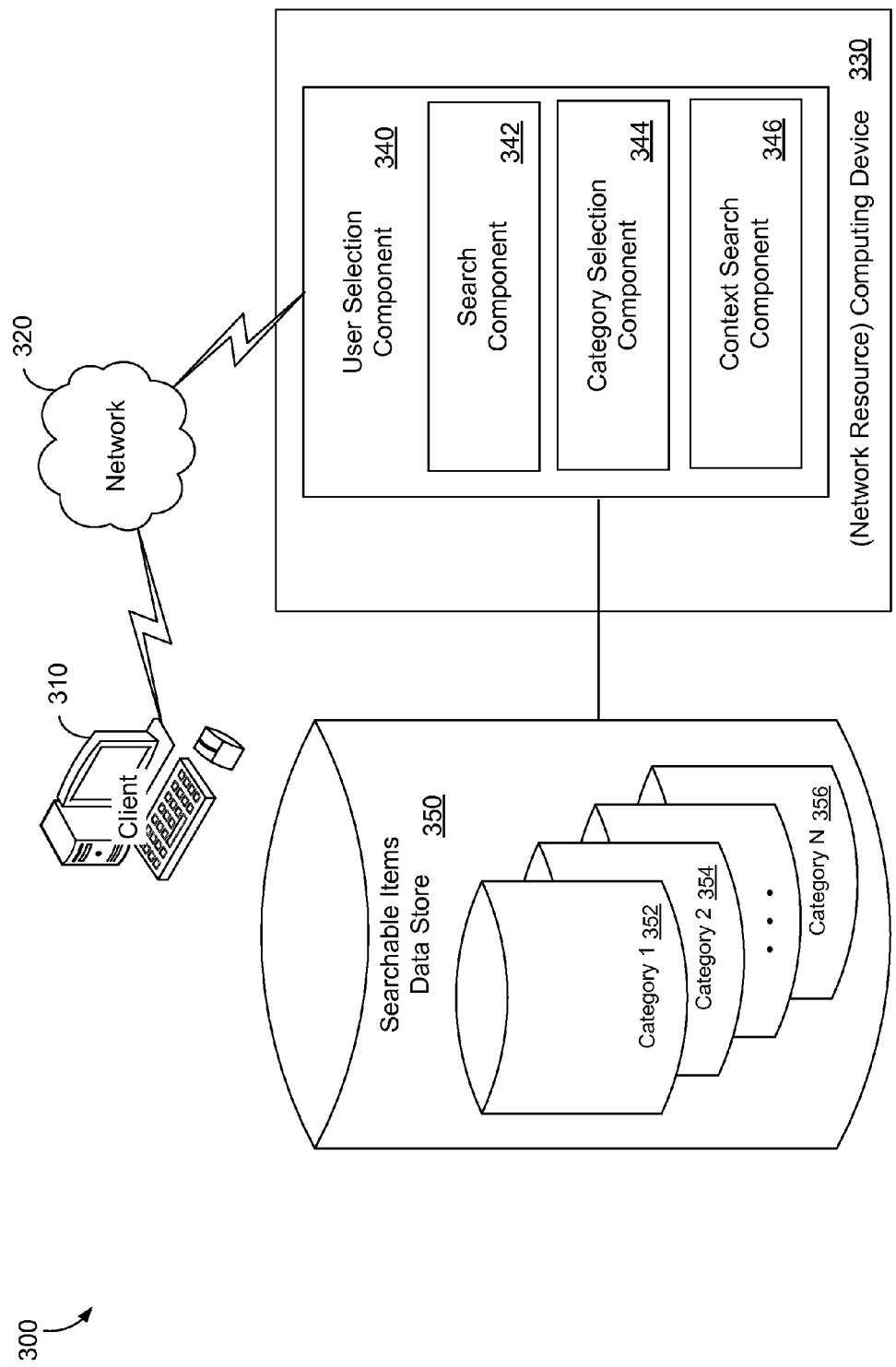
FIG. 3 is a block diagram of one illustrative embodiment of a system enabling searching, category list searching, and category searching.

FIG. 3 shows an illustrative embodiment of a system, generally designated 300, utilized to perform context searching of a selected category or category of searchable items or search results. A user employs a client computing system 310, via a network 320, to access a computing device 330 of a network resource, such as server for an electronic commerce (e-commerce) web site. The computing device 330 has access to a data store 350 that includes a plurality of searchable items.

The client computing system 310 communicates over a network 320, such as the Internet, with a user selection component 340 of the computing device 330. The client computing system 310 may include a nonportable computing device, such as a desktop computer or a television equipped with a network-enabled set-top box, or a portable computing device, such as a notebook computer, handheld computer, mobile phone, electronic book reader, personal digital assistant, network-capable media player, etc. The client computing system 310 may access the network 320 using a wired connection, such as a dial-up connection, digital subscriber line connection, cable connection, or other Ethernet or wired connection. The client computing system 310 also may access the network 320 using a wireless connection provided by IEEE 802.11 Wi-Fi connections, WiMax connections, cellular telephony, or other forms of wireless communication. Those skilled in the art will appreciate that the network 320 may be any wired network, wireless network or combination thereof. In addition, the network 320 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The user selection component 340 enables users to select from among the plurality of searchable items included in the data store 350. In one embodiment, the user selection component 340 may include a search component 342 that enables a user to perform a search of all of the searchable items within the data store 350. The user selection component 340 also may include a category selection component 344 that enables the user to access the searchable items hierarchically by selecting categories into which the searchable items in the data store 350 are collected. As shown in FIG. 3, the data store 350 may maintain either physically separate or logically separate collections of searchable items, such as category 1 352, category 2 354, through category N 356, into which the searchable items may be classified. By selecting one of the categories 352-356, the user can browse the selected category.

According to one embodiment, the user selection component 340 also includes a context search component 346 that enables the user to initiate a refined search of a selected category from within a set of search results and from a position on a user interface where the category is identified. The context search component 346 enables the user to conduct the refined search of one or more searchable items classified under or otherwise associated with a selected category using one or more search terms. The user is able to conduct this refined search without having to exit the current search context. In an illustrative embodiment, the user also is able to enter the search terms proximate to the selected category, without having to redirect a cursor to enter input in a search input field included in another portion of a user interface.

Figure 4:
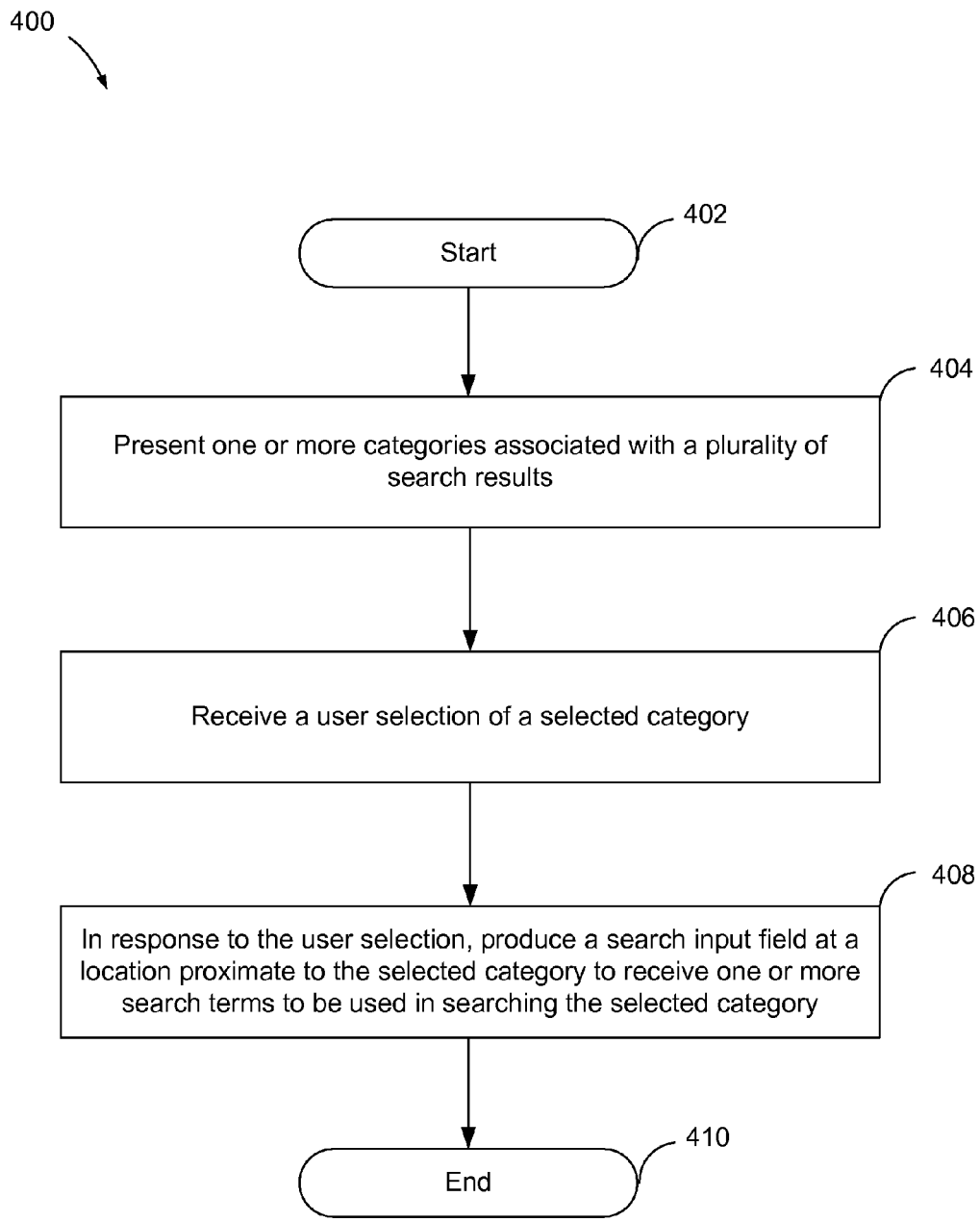
FIG. 4 is a flow diagram of one illustrative embodiment of a method for enabling category searches.

FIG. 4 is a flow chart 400 of one illustrative embodiment of a method for enabling category searches. For purposes of illustration, it will be assumed that a system, such as the system 300 of FIG. 3, performs the method described by the flow diagram 400, as well as the method described by flow diagram 500 of FIG. 5. Thus, according to one embodiment, the context search component 346 of the computing device 330 receives and processes a context search within a selected category among categories 1-N 352-356 of the searchable items data store 350 in performing the methods described by the flow diagrams 400 and 500. However, differently configured systems also may be used to enable or perform the methods described by the flow diagrams 400 and 500. Thus, use of the system 300 to perform the methods described by the flow diagrams 400 and 500 is described by way of illustration, not by way of limitation.

The method begins at 402. One or more categories into which a plurality of search results have been classified or otherwise have been associated are presented at 404. A user selection of a selected category is received at 406. In response to the user selection of the selected category, at 406, a search input field is produced at a location proximate to the selected category, at 408. The search input field is configured to receive one or more search terms to be used in searching the selected category. The method ends at 410.

Figure 5:
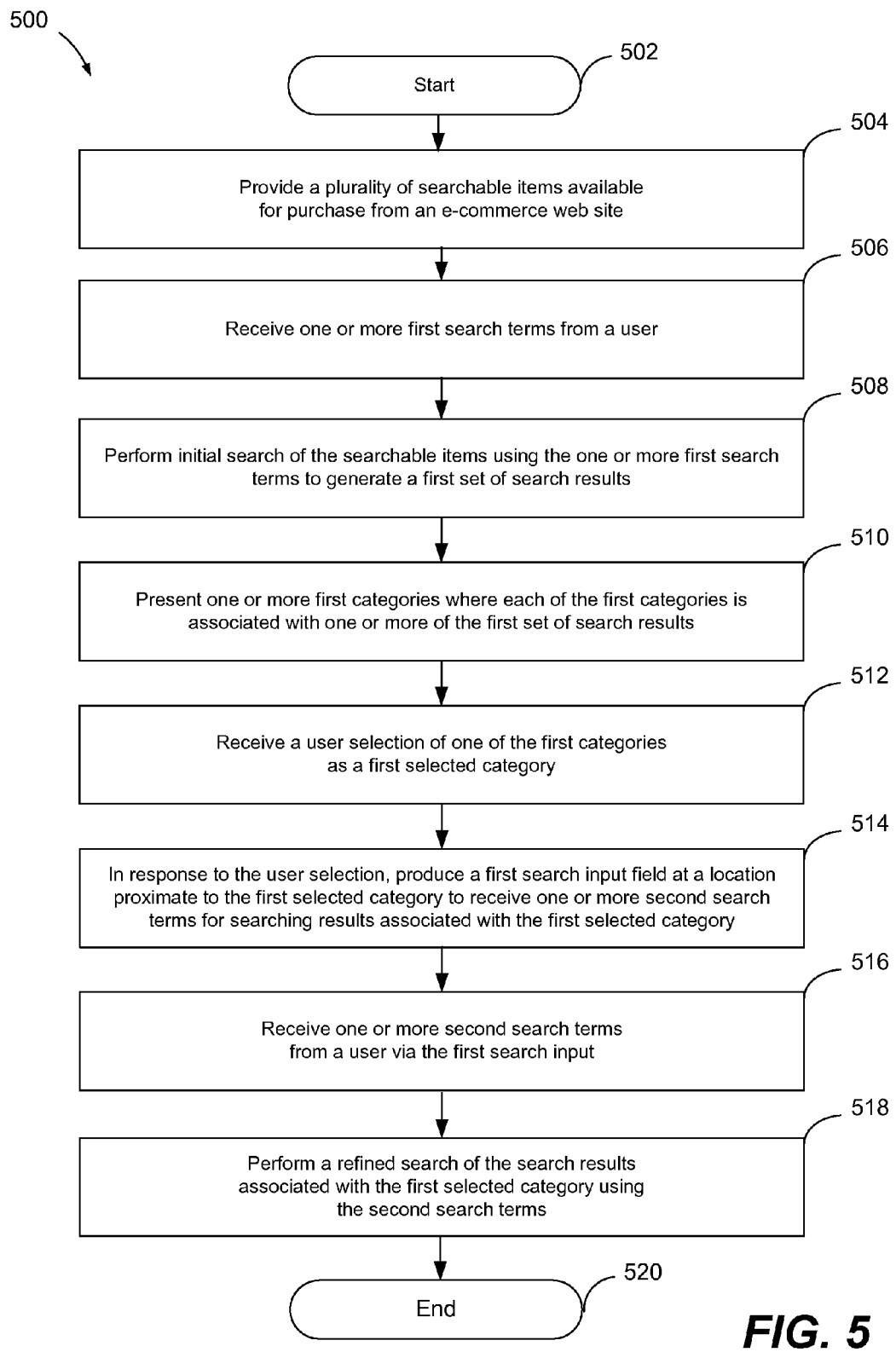
FIG. 5 is a flow diagram of one illustrative embodiment of a method for enabling a context search to refine a search of an e-commerce network resource.

FIG. 5 is a flow chart 500 of another illustrative embodiment of a method for enabling context searches to refine a search of an e-commerce web site. The method begins at 502. A plurality of searchable items is provided where the searchable items are available for purchase via the e-commerce web site, at 504. One or more first search terms are received from a user, at 506. An initial search of the searchable items is performed using the one or more first search terms to generate a first set of search results, at 508. One or more first categories are presented, where each of the first categories includes one or more of the first set of search results, at 510, where the first set of search results have been classified under one or more of the first categories or otherwise have been associated with one or more of the first categories.

A user selection of one of the first categories is received as a first selected category, at 512. In response to the user selection of one of the first categories, at 512, a first context search input field is produced at a location proximate to the first selected category to receive one or more second search terms, at 514. The second search terms are to be used in searching the first set of search results classified under or otherwise associated with the first selected category. The second search terms are received from the user via the first context search input field, at 516. A refined search of the first set of search results classified under or otherwise associated with the first selected category is performed, at 518. The method ends at 520.

For purposes of illustration, a system, such as the system 300 of FIG. 3, through its computing device 330, may perform context searches within a selected category among categories 1-N 352-356 of the searchable items data store 350 in performing the methods described by the flow diagrams 400 and 500 to generate user interfaces 100 and 200 previously described with reference to FIGS. 1 and 2 and user interfaces 600-1600 described below with reference to FIGS. 6-16. However, differently configured systems and other methods also may be used to generate the user interfaces described below. Thus, use of the system 300 and the flow diagrams 400 and 500 to generate the user interfaces 100-200 and 600-1600 is described by way of illustration, not by way of limitation.

According to embodiments of the present disclosure, a user may perform context searches of searchable items by using a browser to access a network resource as previously described with reference to FIG. 3. To support functions provided by the user interfaces that are not natively provided by a client browser application, the network resource may provide instructions or instruct the user as to how to configure the client browser to enable the user to perform context searching. Alternatively, the network resource may provide access to an application-specific or a general application platform plugin that provides the client browser with the capability to perform context searching. In one embodiment, the browser, with or without additional configuration instructions or a plugin, is able to generate the search input field and receive additional search terms into the search input field without having to interact with the network resource or another server system. In such an embodiment, the client computing system independently generates the search input field in response to a user selection.

Figure 6:
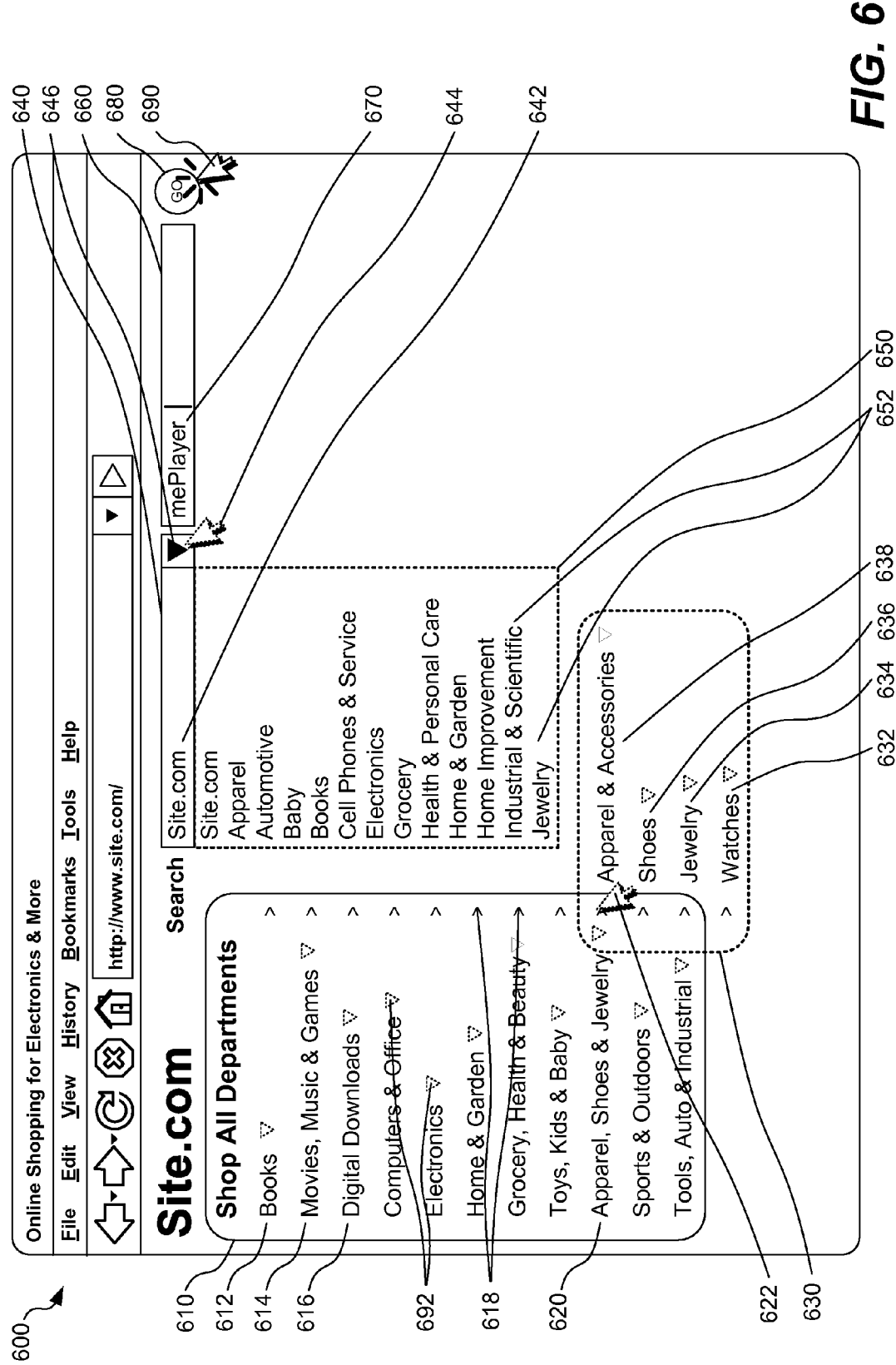
FIG. 6 depicts an illustrative embodiment of a user interface enabling a context search from within a previous search.

FIG. 6 is a user interface 600 depicting multiple ways to search the searchable items including by using a process according to the present disclosure. The user interface 600 is similar to the user interface 100 described with reference to FIG. 1 in that the user interface 600 presents a home screen that includes a category list 610 that enables a user to access a plurality of main categories into which the searchable items accessible through the network resource are classified or with which the searchable items are otherwise associated. For example, the category list 610 includes a books category 612, a movie, music & games category 614, and a digital downloads category 616. However, different from the user interface 100 of FIG. 1, categories included in the category list 610 of the user interface 600 of FIG. 6 may include subcategory markers 618 that indicate when the categories include searchable subcategories. By using a cursor 622 to select one of the subcategory markers 618 or hovering the cursor 622 over one of the subcategory markers 618, the user can access a subcategory list for the specified category. For example, by manipulating the cursor 622 to select a subcategory marker associated with the apparel, shoes & jewelry category 620, the user can invoke the apparel, shoes & jewelry subcategory list 630 from which the user can select one of the subcategories 632-638. Upon selecting one of the categories from the category list 610 or one of the subcategories from the subcategory list 630, the user may be presented with a category or subcategory page, respectively, from which the user can explore the web site.

Alternatively, instead of hierarchically stepping from the category list 610 and one or more subcategory lists, such as the subcategory list 630, the user can also search the searchable items. The user interface 600 presents a category identifier 640 that indicates a current search category 642. To select a search category, for example, the user may manipulate a cursor 644 to select a pull-down menu button 646 that will invoke a category search list 650 including one or more listed categories 652. Once one of the listed categories 652 is selected (or a default category, such as to search the entire web site), in a search input field 660, the user may enter one or more search terms 670. By manipulating the cursor 690 to select a search or "go" button 680, the user is able to search the searchable items.

Searching for a desired item by using the category list 610 and the subcategory list 630 or using the search input field 660 to search a listed category 652, involves a series of manipulations and the user may have to step through numerous displays. For example, to use the search input field 660 to search a listed category 652, the user manipulates the pull-down menu button 646 and selects from the category search list 650 on one portion of the user interface 600, then direct the cursor to the search input field 660 on another portion of the user interface 600 to enter the search terms.

By contrast, according to illustrative embodiments of the present disclosure, as further described below, when the user selects one of the categories from the category list 610, a search input field is produced at the point of the selected category enabling the user to enter one or more search terms into the search input field produced at that location. Thus, the user can initiate a search without manipulating the cursor to multiple different locations on the user interface 600. To indicate to a user that a category is configured to be selected such that a search input field will be produced at the point of the searchable category, an indicator 692 is presented proximate to the category. In one embodiment, the indicator 692 may be presented selectively. For example, the indicator 692 may not be shown until the user moves a cursor into a portion of the user interface 600 over or close to the category list 610, as further explained below. The indicator 692 is presented as a dotted line to indicate that the indicator 692 may be selectively presented.

In the embodiment shown in FIG. 6, by the presence of the indicators 692 in the category list 610, the user may initiate a context search at the point of a selected category from the initial user interface 600. Alternatively or additionally, the context search may be made available on a subsequent user interface after the user already has selected a category from the category list 610 for further investigation or once the user has performed an initial search. Thus, the user is able to refine a search in the context of the category list, without resorting to directing the cursor to different parts of the screen or performing multiple selection manipulations as previously described. FIGS. 7-10 illustrate an example of a user performing a context search from a list of search results generated from an initial search.

Figure 7:
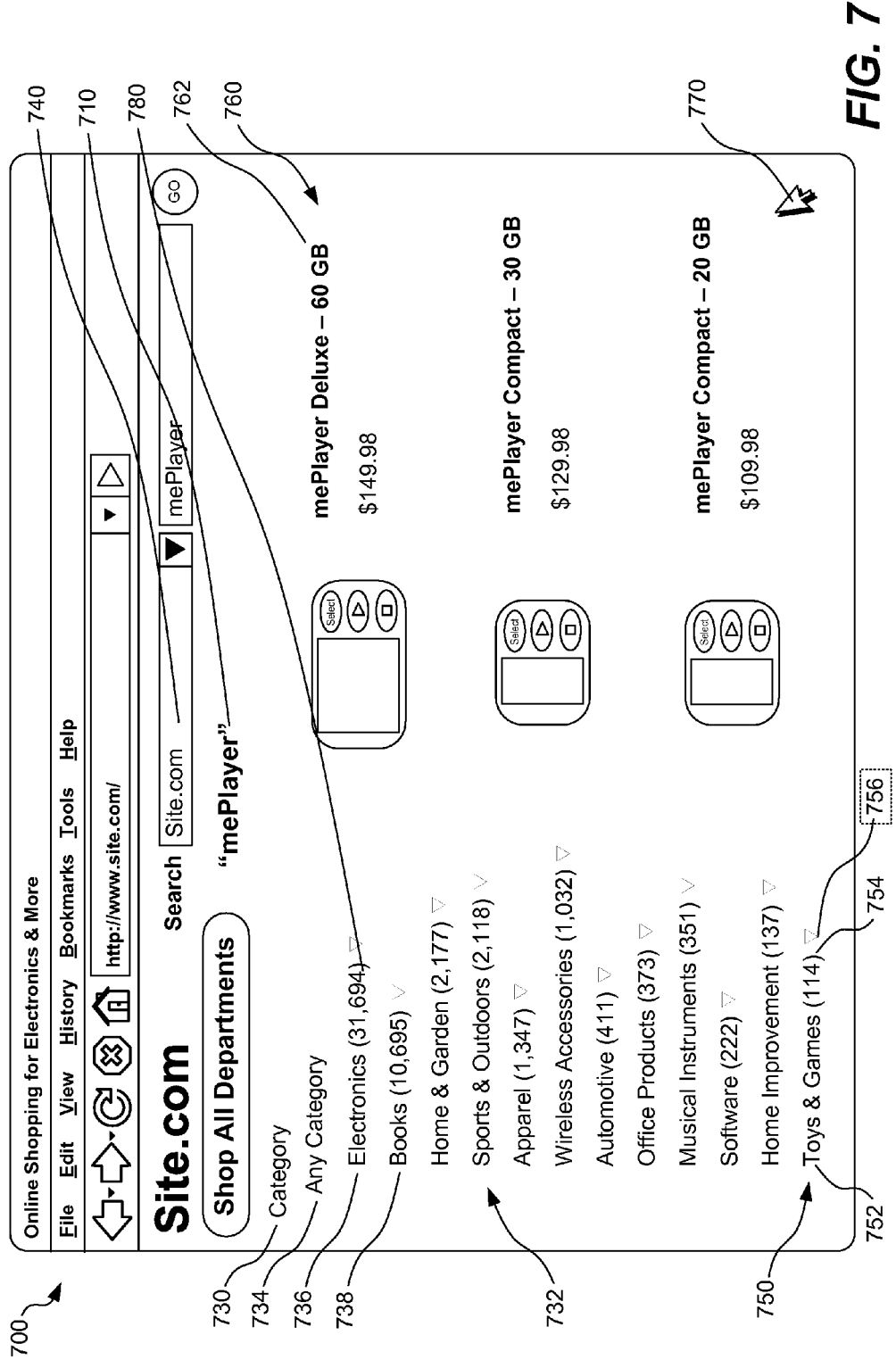
FIG. 7 depicts an illustrative embodiment of a user interface presenting indicators showing the availability of a context search.

FIG. 7 shows a user interface 700 presenting results of a previous search that, for example, may have been performed using the search input field 460 of the user interface 400 of FIG. 4. For example, the user interface 700 presents a search header 710 that includes the search term "mePlayer," which is the same as the search term 670 entered in the search input field of the user interface 600 of FIG. 6. The search header 710 serves to remind the user of what search the user has performed to this point. As indicated by the category identifier 740, the search using the search term "mePlayer" was performed on all of "site.com." As further described below, if the user has performed the search in a particular category, the particular category searched may be included in the search header 710.

The user interface 700 also presents a category list 730 that identifies searchable categories 732 into which searchable items included in the search results 760 have been classified or that otherwise are associated with the search results 760 presented in response to the previous search. The searchable categories 732 are each associated with one or more search results 760, allowing the searchable categories 732 to be further searched to find desired items. In the embodiment shown in FIG. 7, the first listed category in the category list 730 is "Any Category" 734. The Any Category 734 indication reflects that the search results 760 were not drawn from any particular category because the user did not specify a category for the previous search as previously described. The searchable categories 732 in the category list 730 also include, for example, Electronics 736 and Books 738, among other listed searchable categories 732, in which the user may conduct a further search.

In one embodiment, each of the entries in the category list 730 includes two or more visible pieces of information. For example, an example searchable category entry 750 includes a category name 752 (e.g., "Toys & Games"), a number of searchable items 754 (e.g., 114) classified under or otherwise associated with the searchable category 750, and an indicator 756 associated with the searchable category 750. By considering the category name 752 and the number of searchable results 754 classified under or otherwise associated with the searchable category 750, the user may determine whether the user wants to conduct a further search of the category. The indicator 756 identifies that the searchable category 750 is searchable and, in one embodiment, enables the user to perform a further refined search of the searchable category 750.

The user interface 700 of FIG. 7 shows that the search results 760 returned in response to the previous search include results for the mePlayer itself, such as the "mePlayer Deluxe" 762. However, for example, the user may already own a mePlayer and be interested in purchasing a case for the device. Embodiments herein described enable the user to refine the search in context to find the desired items.

As in the case of FIG. 6, the indicator 756 is presented as a dotted line to show the indicator 756 is selectively presented. In one embodiment, where a cursor 770 is located in another portion of the user interface 700 removed from the category list 730, the indicator 756 may not be presented. However, once the cursor 770 is repositioned proximate the category list 730, the indicator 756 may be presented.

Figure 8:
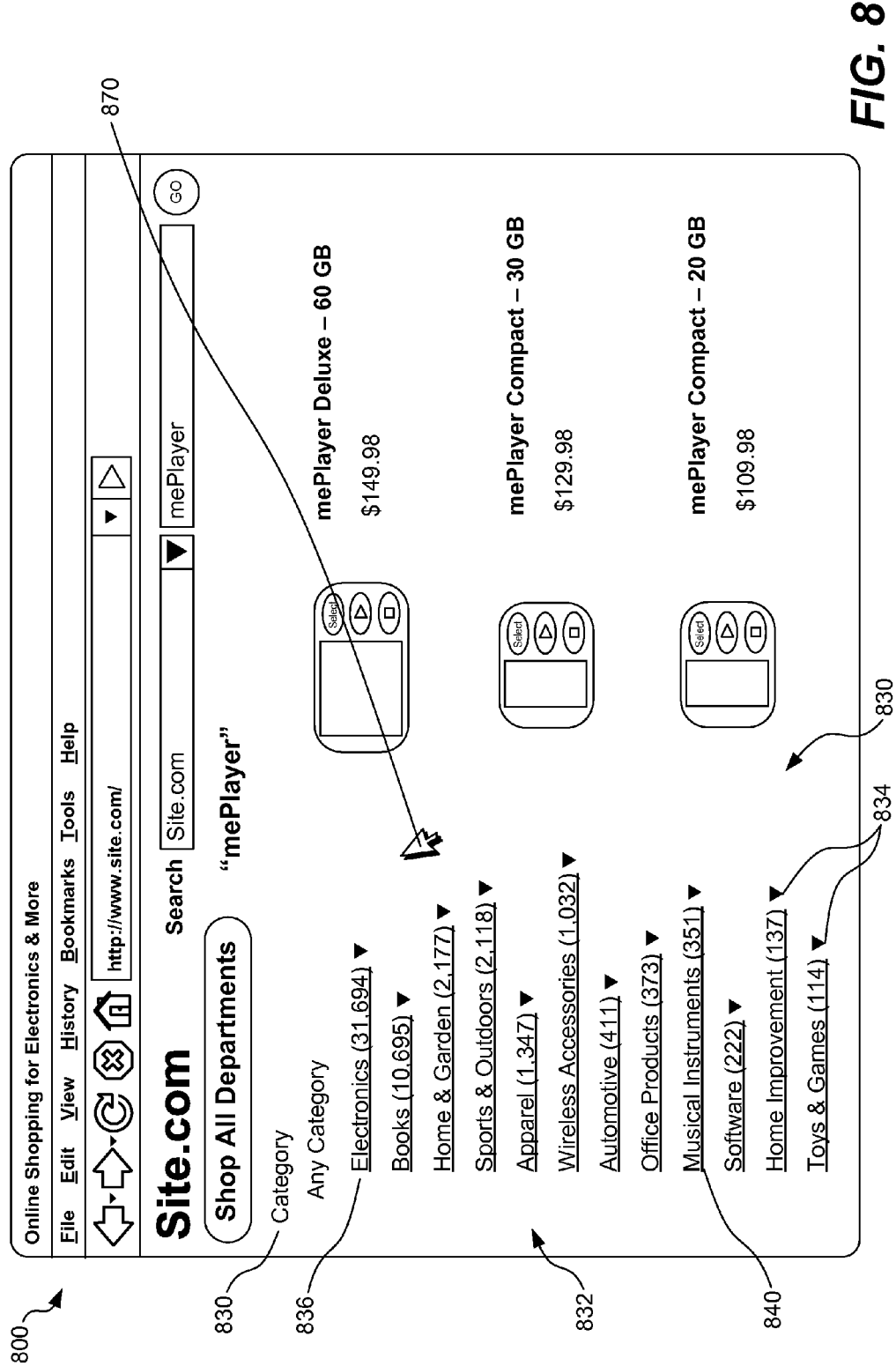
FIG. 8 depicts an illustrative embodiment of a user interface enabling a context search of a category within a category list.

FIG. 8 shows a user interface 800 indicating that the user has directed a cursor 870 to an area 830 on the user interface 800 proximate to the category list 830. As a result, one or more indicators 834 associated with one or more searchable categories 832 are now shown to the user, as represented by the indicators 834 being presented in a solid form. The indicators 834 represent that categories associated with the indicators 834 are searchable categories 832 and, as described with reference to FIGS. 6 and 7, enable the user to select one of the searchable categories 832 to perform a further, refined search.

In addition to or instead of the indicators 834, the font in which the searchable categories 832 are presented may be changed to reflect that the categories are searchable. Thus, for example, in the user interface 800 of FIG. 8, the searchable categories 832 also are presented in a changed font 840 which, in the user interface 800 of FIG. 8, includes an underlined font. The changed font 840, which also may include a bold font, italicized font, differently-colored font, differently-sized font, etc., may be presented when the cursor 870 is positioned proximate to the category list 830. Other visual cues indicating searchable categories may also be used. Alternatively, the visual cue (e.g., changed font 840), as well as the indicator 834, may always be presented with the searchable categories 832 without the cursor 870 being proximate to the searchable categories 832. In further examples used in this detailed description, the searchable categories 832 are represented not only with the indicators 834, but a changed font 840 could be used instead of or in addition to the indicators 834.

Figure 9:
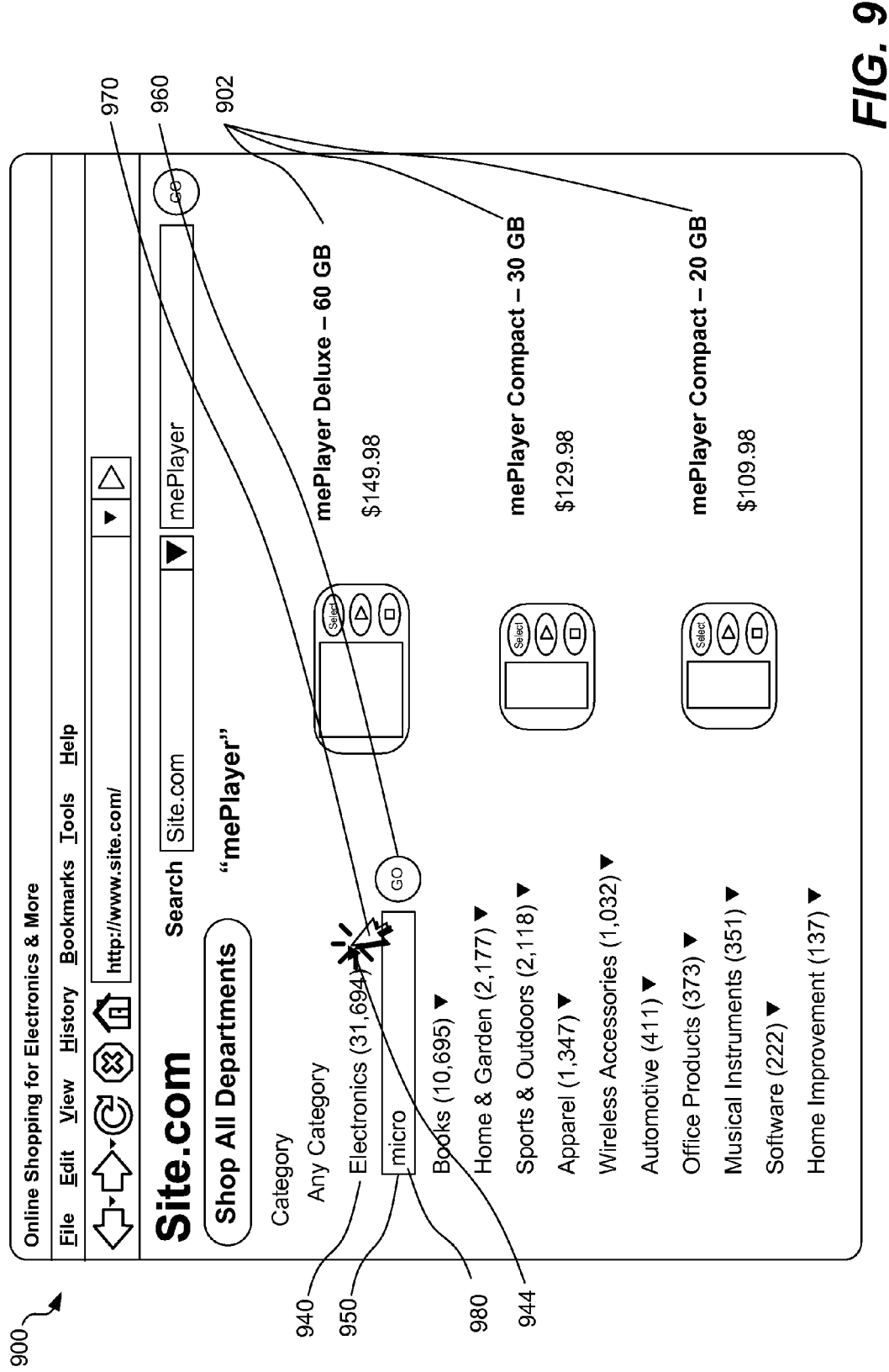
FIG. 9 depicts an illustrative embodiment of a user interface presenting results of the context search of FIG. 8.

FIG. 9 shows a user interface 900 similar to the user interface 200 of FIG. 2. To refine the previous search and to narrow the search results 902 presented in the user interface, the user invokes the context search function by, in one embodiment, the user manipulates a cursor 970 to choose or hover over an indicator 944 associated with the selected searchable category 940 for "Electronics." The user selection of selected category 940 results in a search input field 950 and a "GO" button 960 being presented proximate to the selected searchable category 940. In the example of FIG. 9, the search input field 950 is presented just below the searchable category 940. However, the search input field 950 may also be presented above the selected searchable category 940, completely or partially offset to the left or right of the selected searchable category 940, superimposed over top of the selected category 940, or any combination or variation thereof. The search input field 950 includes a search button or "Go" button 960 enabling the user to initiate the search from the position proximate to the selected category 940. In the example of FIG. 9, the user has entered a search term 980 "micro" in an attempt to refine the search to find desired search results.

Figure 10:
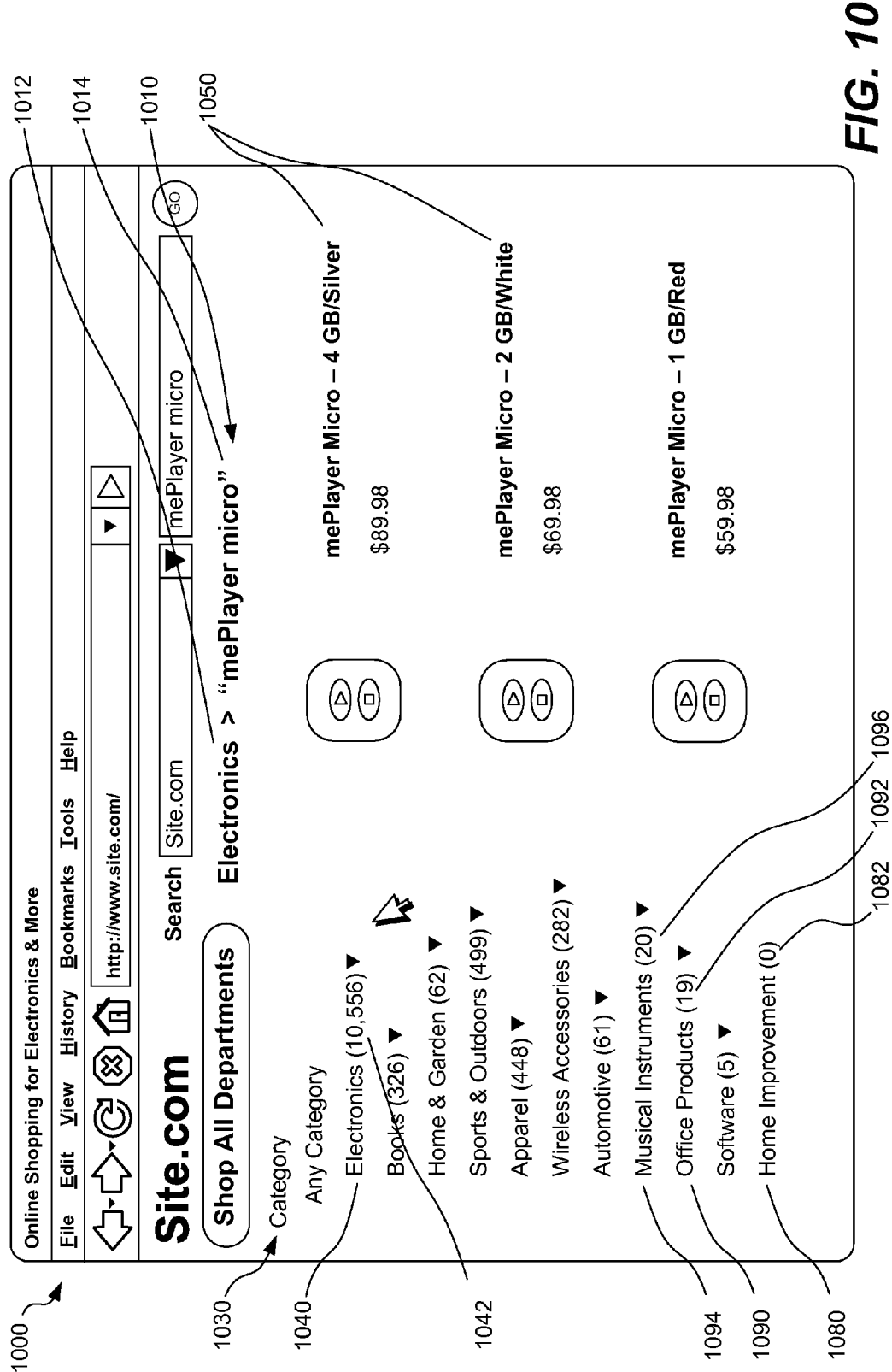
FIG. 10 depicts an illustrative embodiment of a user interface showing the availability of a context search within a previously-searched category.

FIG. 10 shows a user interface 1000 presenting a plurality of search results 1050 generated from among a plurality of searchable items. As previously described, the search results 1050 are produced by a refined search entered as described with reference to FIG. 7. Because the search results 1050 are the result of a search of the selected category 440 for Electronics and using the further search term "micro," the search header 1010 is updated to include a header category 1012 Electronics and the search terms 1014 mePlayer and micro.

The searchable category list 1030 also is updated. The searchable category 1040 is updated to show that, based on the search terms 1014 of mePlayer and micro, a number of searchable results 1042 classified under or otherwise associated with the category "Electronics" 1040 is changed to "10,556" (down from the number of searchable results of "31,694" 780 classified under or otherwise associated with the category "Electronics" 736 before the search terms were changed, as shown in FIG. 9). Similarly, the categories presented as searchable categories in the category list 1030 may also change. For example, in the embodiment shown in FIG. 10, when a searchable category presented in a preceding category list is no longer associated with any of the search results 1050, the affected category may be identified as no longer being searchable. For example, as shown in FIG. 10, a category 1080 for Home Improvement was formerly associated with a number of searchable items 1082 numbering 137 (as shown in FIG. 7). However, in the search results 1050, the category 1080 for Home Improvement is not associated with any searchable items. This is reflected in the number of searchable items 1082 reading "0" and the fact that an indicator is not presented for the category 1080, showing the category 1080 is no longer a searchable category. Alternatively, the category list 1030 may simply omit categories that are not searchable or no longer searchable because no searchable items are associated with the omitted category.

In addition, an order in which searchable categories in the category list 1030 are presented may change in response to a refined search. In one embodiment, the searchable categories included in the category list 1030 may be presented in an order according to which of the searchable categories contains or otherwise is associated with the largest number of search results. For example, as shown in FIG. 10, a searchable category 1090 for Office Products previously was associated with a number of searchable items 1092 totaling 373 (see FIG. 7) and was listed above a searchable category 1094 for musical instruments that was previously associated with a number of searchable items 1096 totaling 351 (see FIG. 7). However, in response to the refined search of FIG. 7, in the search results 1050, the searchable category 1090 for Office Products now includes or is otherwise associated with a number of searchable items 1092 totaling "19," while the searchable category 1094 for Musical Instruments now includes or is otherwise associated with a number of searchable items 1096 totaling "20." Thus, in the category list 1030, the searchable category 1094 for Musical Instruments is now listed before the searchable category 1090 for Office Products.

As further described with reference to FIGS. 11-14, the search results 1050 may be further searched to refine the results of the search. The search results 1050 that are generated by a first search by applying a first set of search terms (mePlayer and micro) to a set of previous search results (e.g., the search results of FIG. 7) may be considered a first set of search results. Subsequent refinements of the search may be considered as a second set of search results as generated by applying a second set of search terms in a category search. However, the previous search results generated by the original search as shown in FIG. 7 also may be considered the first set of search results while the first refined set of search results may be considered the second set of search results. Accordingly, any designation of a set of search terms or search results as being first or second in the following example is a relative, sequential designation used for clarity and should not be construed as limiting embodiments of the present disclosure.

Figure 11:
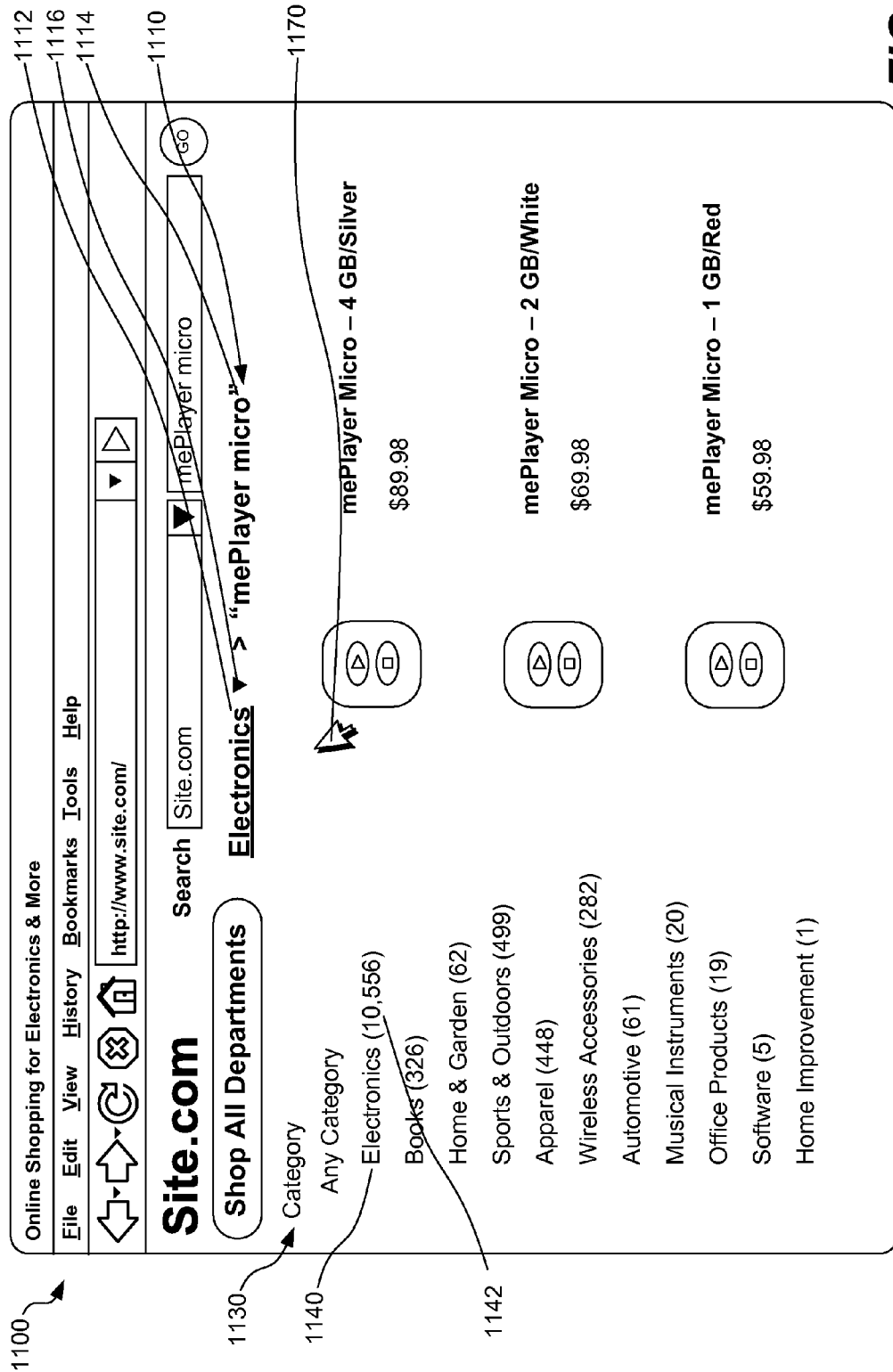
FIG. 11 depicts an illustrative embodiment of a user interface enabling an animated presentation of a search input field to initiate a category search.

FIG. 11 shows a user interface 1100 from which a user may further refine a search. Instead of initiating a context search from the category list 1130, as in the previous example, however, the user may engage the context search from the search header 1110. As previously described, when a search is performed using a selected category, such as the previously selected category 1112 for Electronics, the selected category 1112 may be included in the search header 1110 along with previously used search terms 1114. As in the case of the indicators 834 of the user interface 600 of FIG. 8 being presented when the cursor 870 is positioned proximate to the category list 830, an indicator 1116 may appear in the header 1110 to identify that the selected category 1112 is further searchable. As previously described with reference to FIG. 7, the selected category 1140 for Electronics is further searchable, as indicated by the selected category 1140 including or otherwise being associated with the number of searchable items 1142 numbering "10,556." In the example of FIG. 11, when the cursor 1170 is proximate to the search header 1110, such as being within a same half of the user interface 1100 or in some other same section of the user interface 1100, the selected category 1112 appears in a changed font 1116. The changed font 1116 in the example of FIG. 11 is an underlined font.

Figure 12:
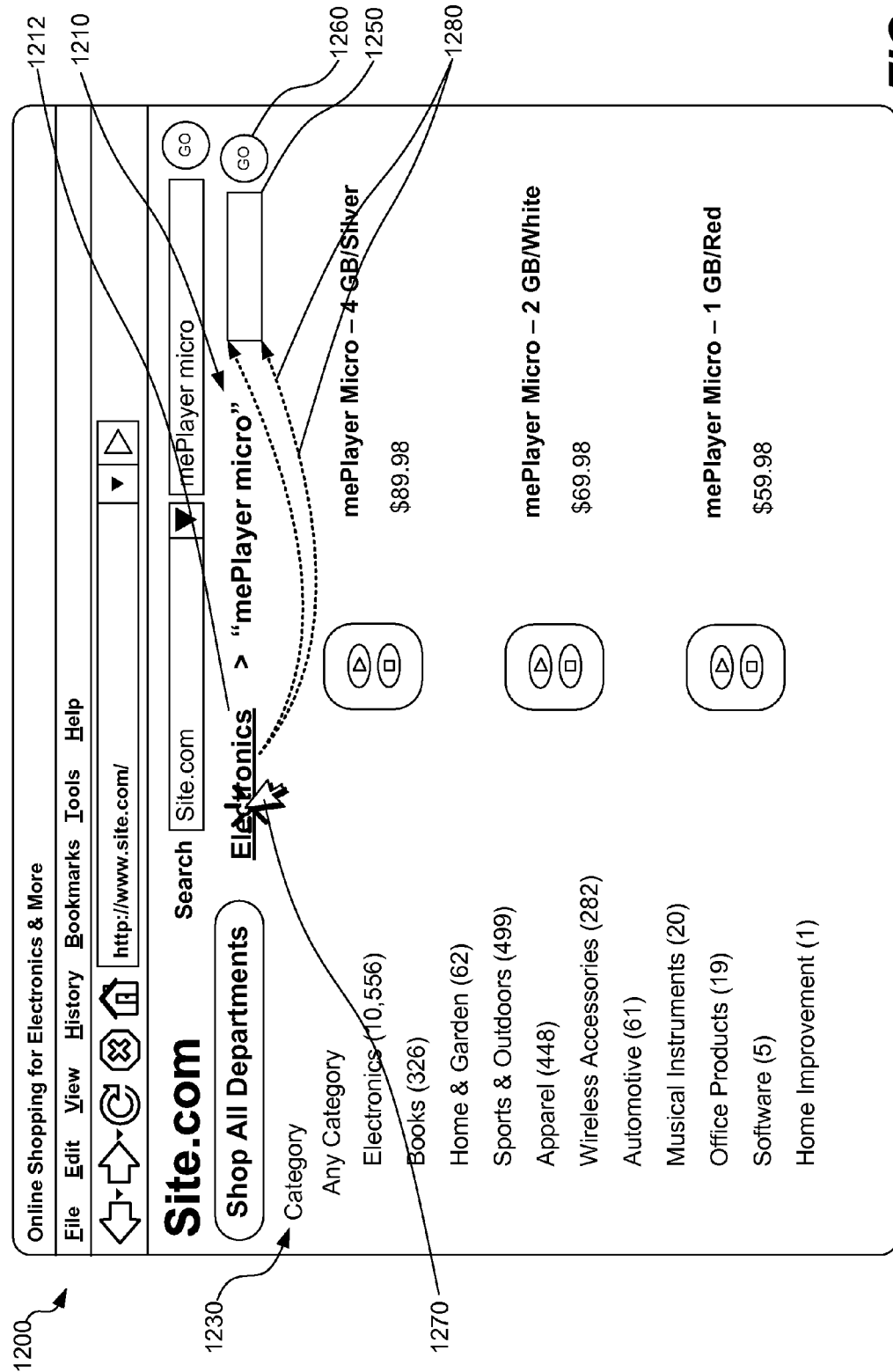
FIG. 12 depicts an illustrative embodiment of a user interface enabling a context search to be initiated within a previously-searched category.

FIG. 12 shows a user interface 1200 in which a user selects a selected category 1212 from a search header 1210 instead of from a category list 1230. Specifically, the user manipulates a cursor 1270 to hover over or select the selected category 1212 from the search header 1210. The user selection of the selected category 1212, in one embodiment, results in a search input field 1250 and an associated search button or go button 1260 being presented adjacent to the search header 1210. It should be noted that the search input field 1250 and the go button 1260 may be presented proximate to the search header 1210 whether the search header 1210 appears at a top of the user interface 1200 or at any other location on the user interface 1200.

In addition, according to illustrative embodiments of the present disclosure, the producing of the search input field 1250 may be presented in an animated form. For example, as depicted by dotted lines 1280, the producing of the search input field 1250 may be animated as showing the search input field 1250 emerging from the selected category 1212, such as by "flying out" of the selected category 1270 to visually clarify that the search input field 1250 was produced from the user selection of the selected category 1212. The animation may include flying out of the selected category 1212 or any other desired form of animation.

Figure 13:
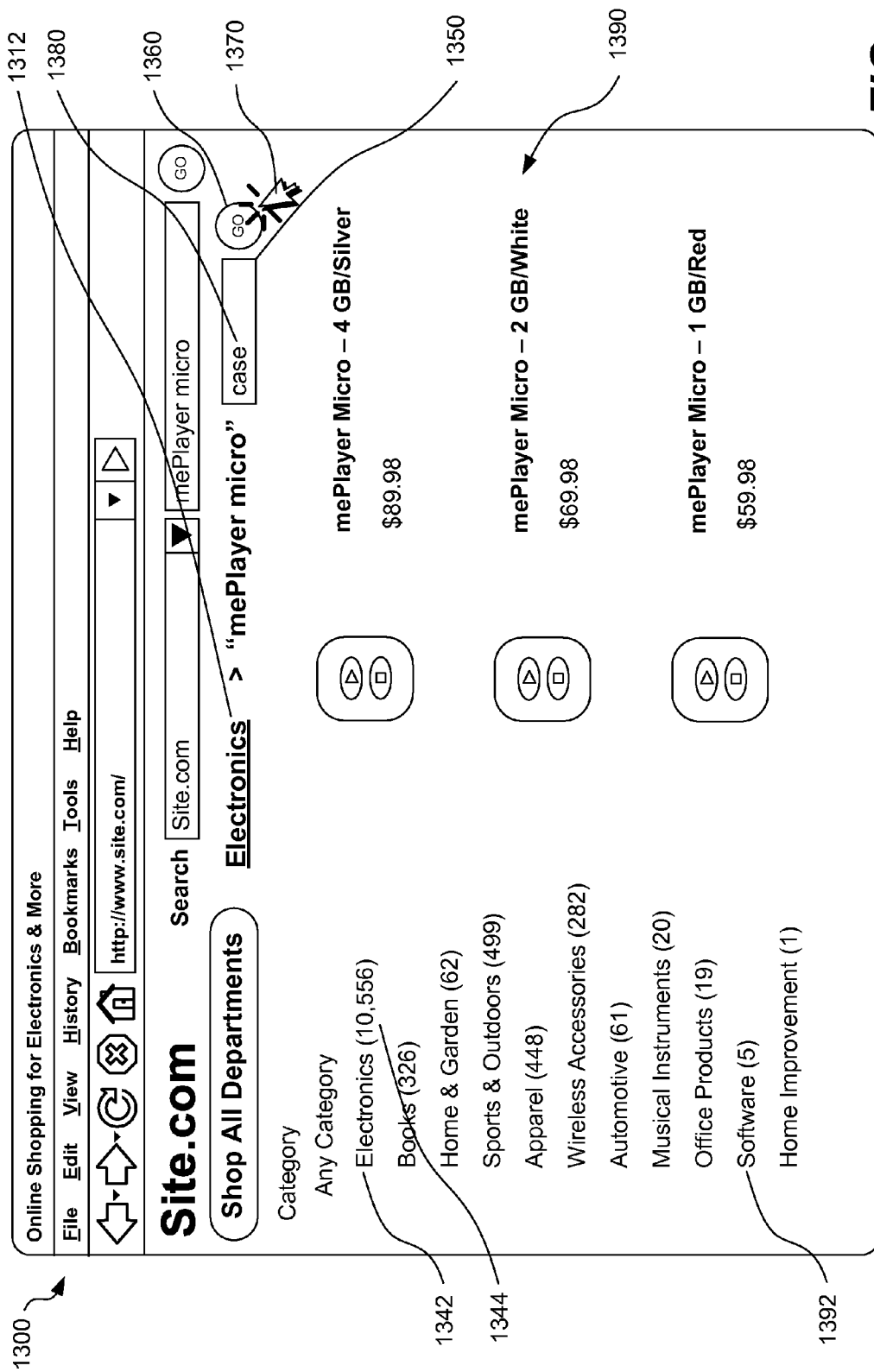
FIG. 13 depicts an illustrative embodiment of a user interface presenting results of the context search within the previously-searched category of FIG. 12.

FIG. 13 shows a user interface 1300 in which a user further refines a search. Specifically, the user enters one or more additional search terms 1380 in a search input field 1350 and selects a go button 1360 with a cursor 1370 to initiate the search. The search will be performed on the selected category 1312 to narrow down the previously retrieved search results 1390 presented in response to one or more previous searches as previously described.

Figure 14:
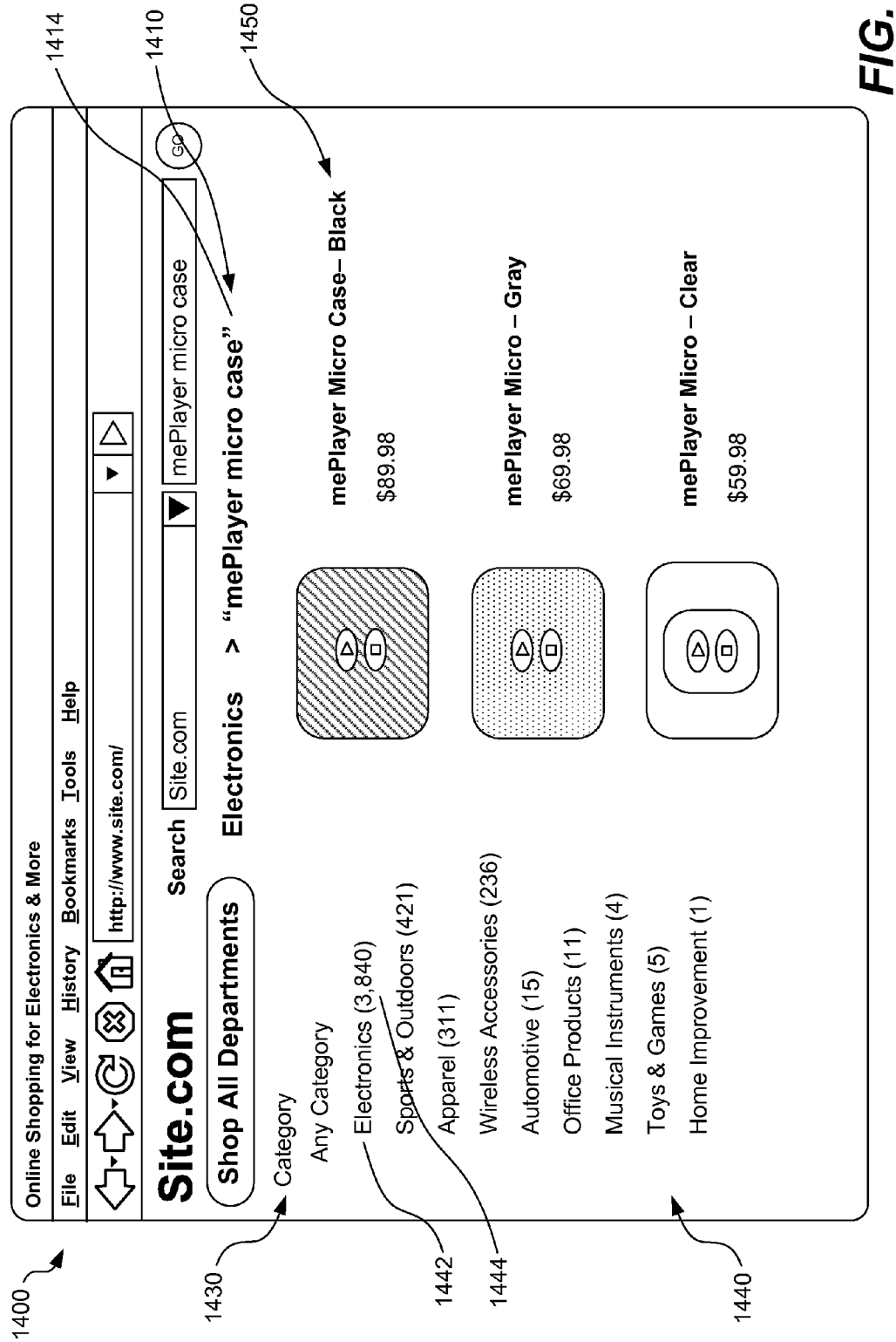
FIG. 14 depicts an illustrative embodiment of a user interface presenting indicators showing the availability of a context search within a subcategory of a previously-selected category.

FIG. 14 shows a user interface 1400 presenting search results 1450 of the refined search initiated by the user as shown in FIG. 13. The user interface 1400 is updated to show that the search header 1410 includes the modified search terms 1414 by adding "case" to the previously-used search terms "mePlayer" and "micro." In addition, the category list 1430 is updated to show changes in a number of searchable items classified under or otherwise associated with each of the searchable categories. For example, a searchable category 1442 for Electronics, after the refinement of the search, now includes or otherwise is associated with a searchable number of items 1444 totaling "3,840," as compared to, as shown in FIG. 13, a searchable number of items 1344 totaling 10,556 associated with a searchable category 1342 of "Electronics" before the refinement of the search. Also, the category list 1430 no longer includes entries, for example, the searchable category 1392 for "Software." The searchable category for "Software" 1392 is omitted from the category list 1430 because no searchable items are classified under or otherwise associated with the searchable category 1192 after the refinement of the search.

Figure 15:
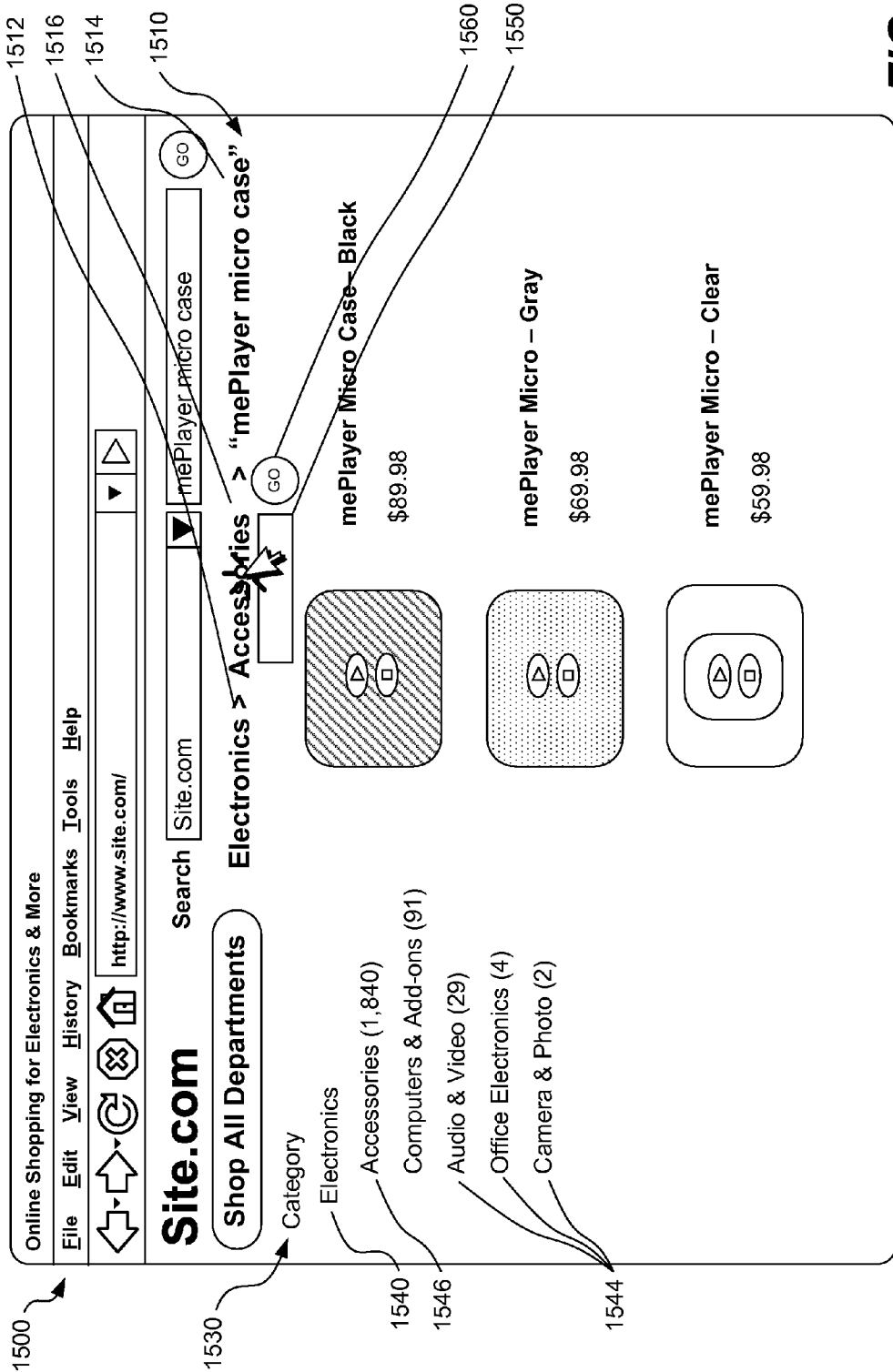
FIG. 15 depicts an illustrative embodiment of a user interface of a home screen including indicators to show the availability of a selected context search from the home screen.

FIG. 15 shows a user interface 1500 showing that the category list 1530 also may include a plurality of subcategories 1544 of a selected category 1540. For example, if a search is performed on a selected category 1540, such as "Electronics," or a selected subcategory 1564, such as "Accessories," the subcategories 1544 of the selected category 1540 may be presented in the category list 1530 instead of or in addition to other main categories such as "Electronics." Similarly, if a search has been refined to include a category and a subcategory, such as by selecting the subcategory 1546 "Accessories" from the subcategories 1544 listed under the category 1540 for "Electronics," a search header 1510 may be updated to include the selected category 1512 for "Electronics" and the selected subcategory 1516 for "Accessories," as well as updating the search header 1510 to include all the search terms 1514 that have been used. Moreover, if the selected subcategory 1516 is selected as a selected category for a further refined search, a search input field 1550 and a go button 1560 are produced to receive one or more further search terms or new search terms to refine the search. The search input field 1550 may be produced in a location proximate to the selected subcategory 1516.

Figure 16:
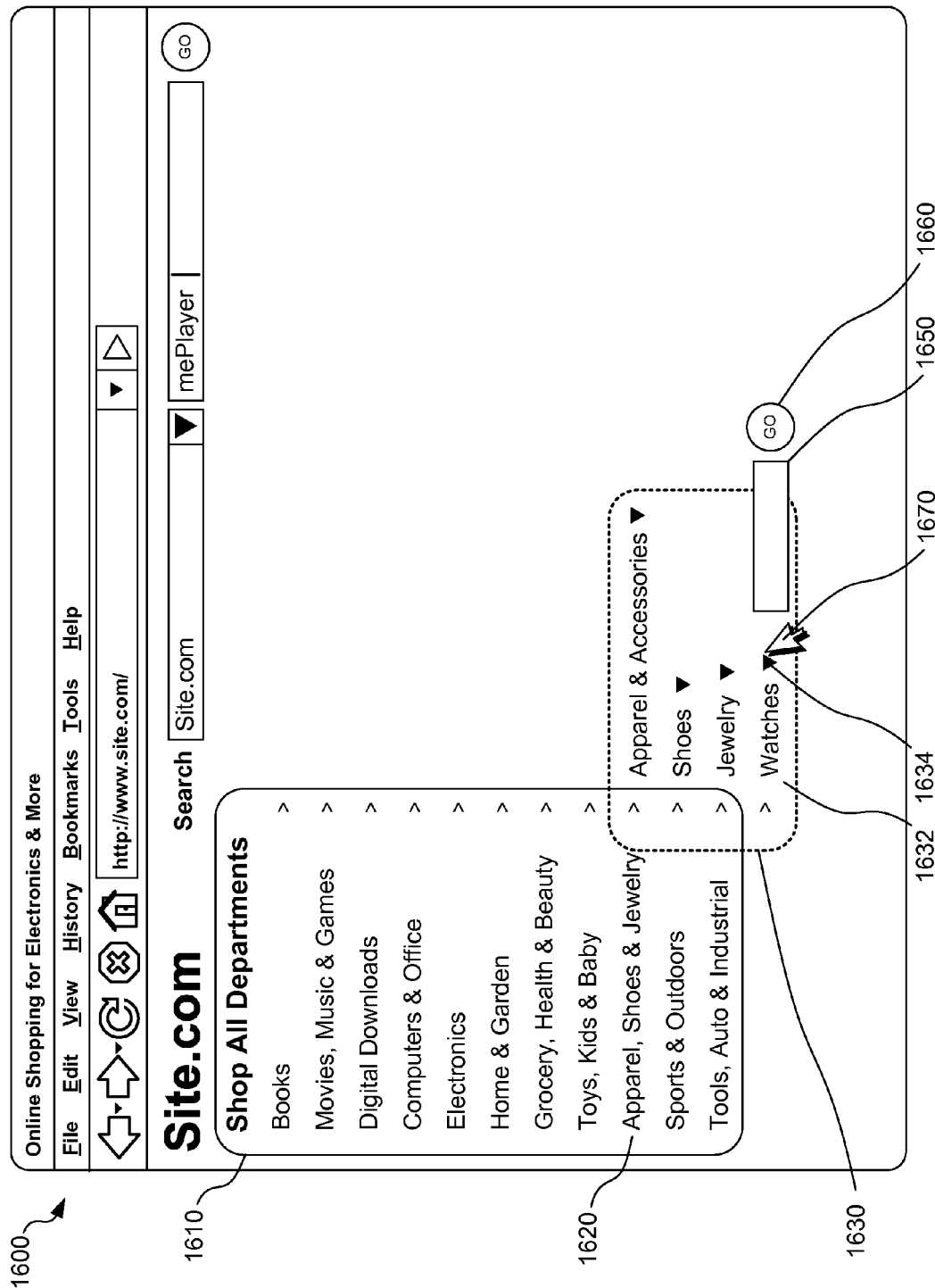
FIG. 16 depicts an illustrative embodiment of a user interface enabling a context search of a selected subcategory from a home screen.

FIG. 16 shows a user interface 1600 representing a home screen of a network resource similar to the user interface 100 of FIG. 1. to further illustrate that category searches as previously described may be performed on a selected subcategory directly from the home screen. As previously described, a user may be able to access a subcategory list 1630 by selecting a category 1620 from a category list 1610 from the home screen. A subcategory included in the subcategory list 1630, such as a subcategory 1632, may be a searchable category as signified by presence of an indicator 1634. By using a cursor 1670 to select the indicator 1634 or otherwise select the subcategory 1632, the subcategory 1632 may be identified as a selected subcategory that can be searched. Once selected, a search input field 1650 and a search button or go button 1660 is produced proximate to the selected subcategory 1532 as previously described.

Embodiments of the present disclosure have been described in some detail in the context of an electronic commerce or "e-commerce" system that enables users to purchase consumer goods from an e-commerce retailer online through a network resource. However, embodiments of the present disclosure are not limited to the purchase of consumer goods or e-commerce. For example, as illustrated in FIG. 1, a network resource may provide access to a market for the sale or rental of homes or the sale of automobiles, whether new or used. Such high value items may transcend what generally is considered to be the realm of consumer goods. Nonetheless, embodiments of the present disclosure may be applied to allow a user to select homes for sale as a category and refine his or her search using the context search function to, for example, narrow the search to a particular area, a particular price range, or any other classifier that may narrow the search results available among the category of homes for sale. Similarly, embodiments of the present disclosure may be applied to on-line auctions or other network resources that market new or used goods.

In addition, embodiments of the present disclosure may be used in non-commercial contexts. For example, embodiments of the present disclosure may be used to search a library catalog by enabling a user to perform a context search on a selected category or subcategory without having to separately identify the category or leave the context of the current search. Similarly, embodiments of the present disclosure may be employed by an information web site or other network resource that includes types of information that are classified into categories or subcategories or otherwise associated with categories or subcategories. Embodiments of the present disclosure are not limited to the types of examples of searchable items as previously described. The foregoing examples thus are provided by way of illustration, not by way of limitation, to explain embodiments of the present disclosure.

Figure 17:
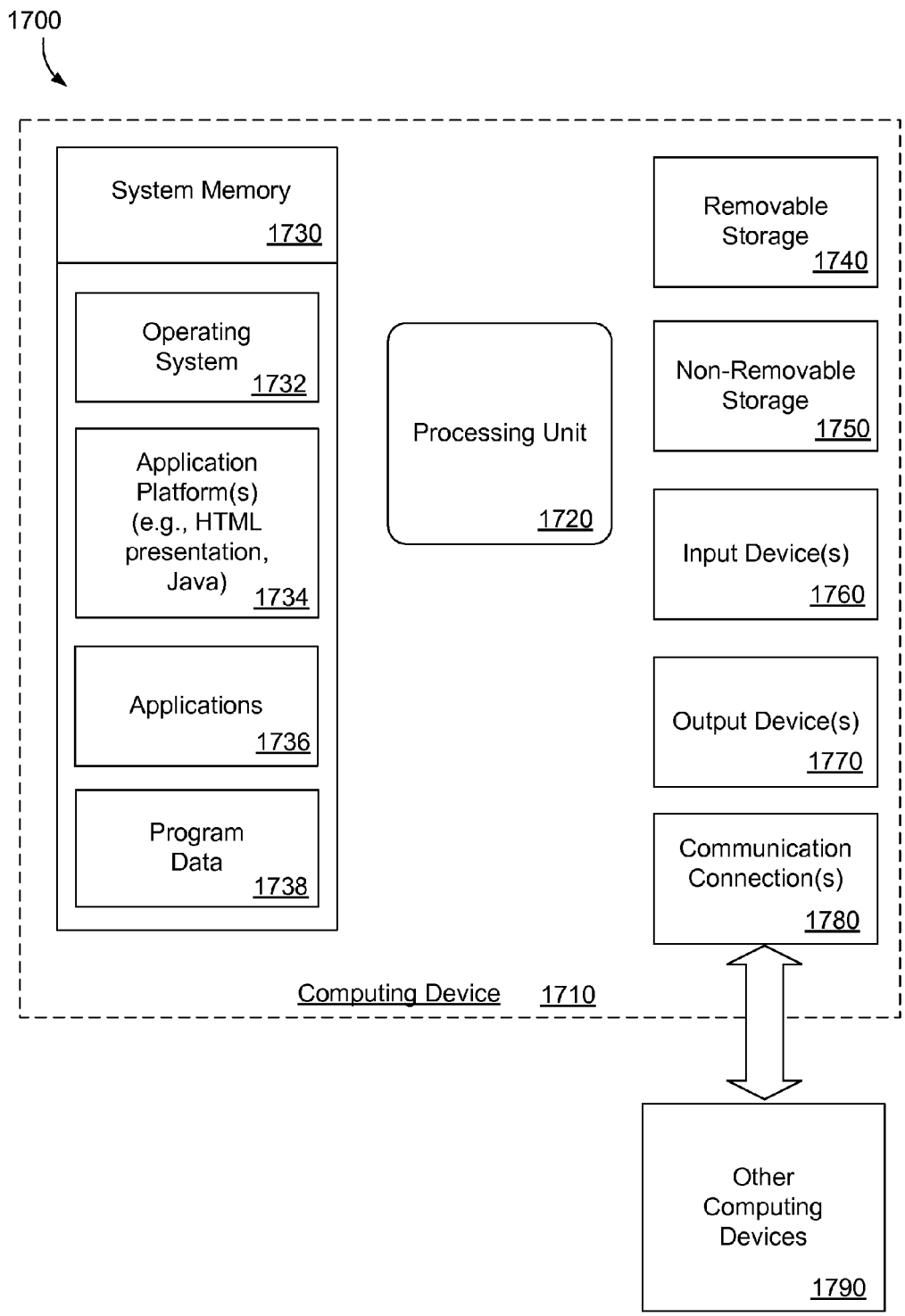
FIG. 17 is a block diagram of a general purpose computer system operable to implement embodiments of computer-implemented methods and computer-readable media according to the present disclosure.

FIG. 17 is a block diagram of a computing environment 1700 including a general purpose computer system 1710 operable to support embodiments of computer-implemented methods and computer-readable media according to the present disclosure. In a basic configuration, the computing device 1710 may include a network server configured to receive and process transactions received over a network. The computing device 1710 typically includes at least one processing unit 1720 and system memory 1730. Depending on the exact configuration and type of computing device, the system memory 1730 may be volatile (such as random access memory or "RAM"), non-volatile (such as read-only memory or "ROM," flash memory, and similar memory devices that maintain the data they store even when power is not provided to them) or some combination of the two. The system memory 1730 typically includes an operating system 1732, one or more application platforms, such as an object-oriented platform 1734, such as Java provided by Sun Microsystems, one or more applications 1736, and may include program data 1738.

The computing device 1710 may also have additional features or functionality. For example, the computing device 1710 may also include removable and/or non-removable additional data storage devices such as magnetic disks, optical disks, tape, and standard-sized or miniature flash memory cards. Such additional storage is illustrated in FIG. 17 by removable storage 1740 and non-removable storage 1750. Computer storage media may include volatile and/or non-volatile storage and removable and/or non-removable media implemented in any method or technology for storage of information such as computer-readable instructions, data structures, program modules or other data. The system memory 1730, the removable storage 1740 and the non-removable storage 1750 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1710. Any such computer storage media may be part of the device 1710. The computing device 1710 may also have input device(s) 1760 such as a keyboard, mouse, pen, voice input device, touch input device, etc. Output device(s) 1770 such as a display, speakers, printer, etc. may also be included.

The computing device 1710 also contains one or more communication connections 1780 that allow the device to communicate with other computing devices 1790, such as a server, over a wired or a wireless network. The one or more communication connections 1780 are an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Not all of the components or devices illustrated in FIG. 17 or otherwise described in the previous paragraphs are necessary to support implementations of the present disclosure. For example, a handheld device may include a single system memory 1730 comprised of a flash memory configured to store an operating system, one or more applications, and all program data. A compact device may or may not include removable storage 1750. In addition, the communication connection 1780 may include only a Bluetooth® radio transceiver and/or a Universal Serial Bus (USB) connection port for backup, update, and networking functions.

According to one illustrative embodiment of the present disclosure, the computing device 1710 may include a client computing device that, via the communication connection 1780, communicates with one or more other computing devices 1790, such as servers accessible over a network. The one or more other computing devices 1790 may generate and present information to the computing system 1710 that caches the information in the system memory 2330 of the client computer system. The information generated by the other computing system 1790 may be manipulated on the computing device 1710. Information about how the information was modified may be stored in the system memory 1730 or in another storage system of the computing device 1710 for later use on the computing device 1710. Alternatively or additionally, information on the modification of the information may be transmitted via the communication connection(s) 1780 to the one or more other computing devices 1790.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:
1. A computer-implemented method, comprising:
under control of one or more computer systems configured with executable instructions,
providing a plurality of searchable items available for purchase via an ecommerce web site;
receiving one or more first search terms from a user;
performing an initial search of the plurality of searchable items using the one or more first search terms to generate a first set of search results;
presenting one or more first categories, wherein each of the one or more first categories is associated with one or more of the first set of search results;

receiving a first user selection of one of the one or more first categories as a first selected category;

in response to receiving the first user selection, producing a first context search input field at a location proximate to the first selected category, wherein the first context search input field is configured to receive one or more second search terms to be used in a first refined search of the one or more of the first set of search results associated with the first selected category;

receiving the one or more second search terms via the first context search input field; and performing the first refined search of the one or more of the first set of search results associated with the first selected category to generate a second set of search results;

presenting one or more second categories, each of the one or more second categories being associated with one or more of the second set of search results;

receiving a second user selection of one of the one or more second categories as a second selected category; and producing a second context search input field at a location proximate to the second selected category, the second context search input field being configured to receive one or more third search terms to be used in a second refined search of the one or more of the second set of search results associated with the second selected category.

2. A system, comprising:

a data store including a plurality of searchable items; and a computing device including a processor and memory for storing instructions executable by the processor, the computing device having access to the data store and being in communication with a network from which user selections are receivable from one or more client computing systems, wherein the computing device further includes, upon execution of the instructions:

a search component configured to search the data store based on one or more first search terms;

a category selection component configured to enable review of a selected first subset of the plurality of searchable items in the data store based on a user selection of a first category; and a context search component configured to receive the user selection of a first selected category, wherein:

the user selection of the first category is made by a user positioning an input indicator proximate to the first category;

the context search component presents a first search input field proximate to the first category selected in response to the input indicator being positioned proximate to the first category; and the first search input field is configured to receive one or more second search terms to perform a refined search using the one or more second search terms within the first selected category to generate a second subset of the plurality of searchable items;

wherein one or more second categories is presented in response to generating the second subset, each of the one or more second categories being associated with one or more of the second subset of the plurality of searchable items, the context search component being further configured to receive a second user selection of one of the one or more second categories as a second selected category, and wherein a second search input field is produced with the second selected category at a location proximate to the second selected category, the second search input field being configured to receive one or more third search terms to be used in a second refined search of the one or more of the second set of subset of the plurality of searchable items associated with the second selected category.

3. The system of claim 2, wherein the first search input field includes a blank field configured to receive the one or more first search terms.

4. The system of claim 2, wherein the context search component is further configured to exclude other searchable items associated with one or more first categories other than the first selected category.

5. The system of claim 2, wherein the context search component is further configured to:

present search results in response to the refined search of the searchable items associated with the selected category;

present subcategories of the selected category associated with the search results; and present a number of the search results associated with each of the subcategories.

6. The system of claim 2, wherein the context search component is further configured to enable the user selection by responding to a user input including a cursor movement indicating the user selection of the selected category.

7. A non-transitory computer readable storage medium storing instructions that, when executed by at least one processor, provide:

a category selection component configured to present one or more categories with a first set of search results based at least in part upon one or more first search terms, wherein each of the one or more categories is associated with one or more searchable items; and a context search component configured to:

receive a user selection of a first selected category;

in response to receiving the user selection, present a first search input field adjacent to the first selected category;

receive one or more second search terms at the first search input field for a refined search to be performed on the one or more searchable items associated with the first selected category; and initiate the refined search of the one or more searchable items associated with the first selected category based on the one or more second search terms to generate a second set of search results;

present one or more second categories, each of the one or more second categories being associated with one or more of the second set of search results;

receive a second user selection of one of the one or more second categories as a second selected category; and produce a second search input field at a location proximate to the second selected category, the second search input field being configured to receive one or more third search terms to be used in a second refined search of the one or more of the second set of search results associated with the second selected category.

8. The non-transitory computer readable storage medium of claim 7, wherein the refined search of the searchable items associated with the selected category does not include a search of any searchable item associated with a category other than the selected category.

9. The non-transitory computer readable storage medium of claim 7, wherein the context search component is further configured to:

present search results in response to the refined search of the one or more searchable items associated with the selected category;

present subcategories of the selected category associated with the search results;
and
present a number of the search results associated with each of the subcategories.

10. The non-transitory computer readable storage medium of claim 7, wherein the context search component is further configured to present an indicator in a location proximate to each of the one or more categories and wherein the indicator signifies that each of the one or more categories is configured to be selected as the selected category, the indicator including one or more of:
   a symbol presented proximate to each of the one or more categories; and
   a change in a font in a label of each of the one or more categories.

11. The non-transitory computer readable storage medium of claim 7, wherein the context search component is further configured to enable the user selection of the selected category by responding to a user input, wherein the user input includes one or more of:
   manipulating a cursor to select one of the selected category and the indicator;
   and
   hovering the cursor over one of the selected category and the indicator.

12. The non-transitory computer readable storage medium of claim 7, wherein the context search component is further configured to employ an animation to present the search input field as emerging from the selected category.

* * * * *